US009058778B2

(12) United States Patent
Rhodes

(10) Patent No.: US 9,058,778 B2
(45) Date of Patent: Jun. 16, 2015

(54) MAINTAINING DC BALANCE IN ELECTRONIC PAPER DISPLAYS USING CONTRAST CORRECTION

(75) Inventor: Bradley J. Rhodes, Alameda, CA (US)

(73) Assignee: Ricoh Co., Ltd., Tokyo (JP)

( * ) Notice: Subject to any disclaimer, the term of this patent is extended or adjusted under 35 U.S.C. 154(b) by 936 days.

(21) Appl. No.: 12/826,548

(22) Filed: Jun. 29, 2010

(65) Prior Publication Data

US 2011/0316889 A1 Dec. 29, 2011

(51) Int. Cl.
*G06F 3/038* (2013.01)
*G09G 3/34* (2006.01)

(52) U.S. Cl.
CPC ........ *G09G 3/344* (2013.01); *G09G 2320/0204* (2013.01); *G09G 2320/0252* (2013.01); *G09G 2320/0257* (2013.01); *G09G 2320/066* (2013.01); *G09G 2380/02* (2013.01)

(58) Field of Classification Search
None
See application file for complete search history.

(56) References Cited

U.S. PATENT DOCUMENTS

| | | | | |
|---|---|---|---|---|
| 7,012,600 | B2 * | 3/2006 | Zehner et al. | 345/214 |
| 8,018,518 | B2 | 9/2011 | Nobels | |
| 2005/0219263 | A1 | 10/2005 | Thompson et al. | |
| 2006/0114488 | A1 | 6/2006 | Motamed | |
| 2006/0212359 | A1 | 9/2006 | Hudgeon | |
| 2006/0218127 | A1 | 9/2006 | Tate et al. | |
| 2006/0253478 | A1 | 11/2006 | Graham et al. | |
| 2006/0287950 | A1 | 12/2006 | Steinbert et al. | |
| 2007/0047781 | A1 | 3/2007 | Hull et al. | |
| 2007/0226374 | A1 | 9/2007 | Quarterman et al. | |
| 2008/0030599 | A1 | 2/2008 | Stavely et al. | |
| 2008/0040162 | A1 | 2/2008 | Brice | |
| 2008/0059390 | A1 | 3/2008 | Cox et al. | |
| 2008/0079692 | A1 * | 4/2008 | Liang et al. | 345/156 |
| 2008/0129667 | A1 | 6/2008 | Zehner et al. | |
| 2009/0012887 | A1 | 1/2009 | Taub et al. | |

(Continued)

FOREIGN PATENT DOCUMENTS

| | | |
|---|---|---|
| CN | 101147130 | 3/2008 |
| JP | 08-335214 | 12/1996 |

(Continued)

OTHER PUBLICATIONS

Anand, Paul, "Foundations of Rational Choice Under Risk", Clarendon Press, Oxford University Press 1993, pp. 1-11.

(Continued)

*Primary Examiner* — Nicholas Lee
*Assistant Examiner* — Duane N Taylor, Jr.
(74) *Attorney, Agent, or Firm* — Patent Law Works LLP

(57) ABSTRACT

Systems and methods for maintaining DC balance in bi-stable displays using contrast correction are disclosed. The system includes a DC balance module and storage for DC corrective waveforms. The DC balance module generates transitional driving schemes which drive pixels to new color values while simultaneously shifting each pixel's relative impulse potential values to be in line with those of the new speed drive scheme. The transitional driving schemes ensure DC balance by performing contrast and color-depth correction. In particular, the transitional driving schemes lower the contrast and reduce the color depth of pixels when increasing the speed of page flipping and raise the contrast and color depth when reducing the speed of page flipping. The present embodiment of the invention also includes a method for variable-speed page flipping with contrast correction and a method for creating a transitional driving scheme.

20 Claims, 11 Drawing Sheets

(56) References Cited

U.S. PATENT DOCUMENTS

| | | | | |
|---|---|---|---|---|
| 2009/0021598 | A1* | 1/2009 | McLean et al. | 348/222.1 |
| 2009/0086945 | A1 | 4/2009 | Buchanan et al. | |
| 2009/0094275 | A1 | 4/2009 | Patton et al. | |
| 2010/0123597 | A1* | 5/2010 | Kitsukawa | 340/825 |
| 2010/0179816 | A1 | 7/2010 | Wu et al. | |
| 2010/0179882 | A1 | 7/2010 | Rigole | |
| 2010/0239176 | A1 | 9/2010 | Yamakado | |
| 2011/0060910 | A1 | 3/2011 | Gormish et al. | |
| 2011/0137818 | A1 | 6/2011 | Goad et al. | |
| 2011/0145094 | A1 | 6/2011 | Dawson et al. | |
| 2011/0231745 | A1 | 9/2011 | Levesque et al. | |

FOREIGN PATENT DOCUMENTS

| | | |
|---|---|---|
| JP | 09-325879 | 12/1997 |
| JP | 2000-69304 | 3/2000 |
| JP | 2000-287164 | 10/2000 |
| JP | 20045700 | 1/2004 |
| JP | 2006-331122 | 12/2006 |
| JP | 2007-257670 | 10/2007 |
| JP | 2007-328489 | 12/2007 |
| JP | 2008-097435 | 4/2008 |
| JP | 2008-524735 | 7/2008 |
| JP | 2008-204469 | 9/2008 |
| JP | 2008537816 | 9/2008 |
| JP | 2009-003596 | 1/2009 |
| JP | 2009-075879 | 4/2009 |
| WO | 2005054933 | 6/2005 |
| WO | WO 2006100194 | 9/2006 |

OTHER PUBLICATIONS

PCT Search Report and Written Opinion, PCT Patent Application No. PCT/JP2011/070675, Dec. 6, 2011, 13 pages.

Wu et al. "User-Preference Based Service Selection Using Fuzzy Logic" (2010) CNSM, pp. 342-345 (http://ieeexplore.ieee.org/stamp/stamp.jsp?arnumber=05691228).

United States Office Action, U.S. Appl. No. 12/826,578, Mar. 28, 2012, 22 pages.

United States Office Action, U.S. Appl. No. 12/879,148, Apr. 19, 2012, 28 pages.

United States Office Action, U.S. Appl. No. 12/826,556, Apr. 27, 2012, 23 pages.

Zadeh, L.A., "Fuzzy Sets", Department of Electrical Engineering and Electronics Research Laboratory, University of California, Berkeley, California, Information and Control 8, pp. 338-353 (1965).

Dempster, A.P., "Upper and Lower Probabilities Induced by a Multivalued Mapping", The Annals of Mathematical Statistics, vol. 38, No. 2 (Apr. 1967), pp. 325-339.

Shafer, Glenn, "A Mathematical Theory of Evidence", Princeton University Press, 1976, pp. 1-15.

Anand, Paul, "Foundations of Rational Choice Under Risk", Clarendon Press, Oxford University Press 1993.

Zadeh, L.A., "Fuzzy Sets As a Basis for a Theory of Possibility", Fuzzy Sets and Systems 100 Supplement (1999), Computer Science Division, Department of Electrical Engineering and Computer Science and the Electronics Research Laboratory, University of California, Berkeley, CA 94720, USA, pp. 9-34.

PCT Search Report and Written Opinion, PCT Patent Application No. PCT/JP2011/064600, Jun. 20, 2011, 12 pages.

PCT Search Report and Written Opinion, PCT Patent Application No. PCT/JP2011/065128, Jun. 24, 2011, 10 pages.

PCT Search Report and Written Opinion, PCT Patent Application No. PCT/JP2011/065236, Jun. 27, 2011, 11 pages.

* cited by examiner

302

| Transitional Driving Scheme FPP 3 to FPP 5 (slowing down) | | | | | | |
|---|---|---|---|---|---|---|
| | To | | | | | |
| From | 0-1 | 2-3 | 4-7 | 8-B | C-D | E-F |
| 0-1 | ++... | .+... | .+-.. | .+—. | .+— | ..— |
| 2-3 | ++... | .+... | .+-.. | .+—. | .+— | ..— |
| 4-7 | +++.. | .++.. | .+... | .+-.. | .+—. | ..—. |
| 8-B | ++++. | .+++. | .++.. | .+... | .+-.. | ..-.. |
| C-D | +++++ | .++++ | .+++. | .++.. | .+... | ..... |
| E-F | +++++ | .++++ | .+++. | .++.. | .+... | ..... |

Figure 3

MAINTAINING DC BALANCE IN ELECTRONIC PAPER DISPLAYS USING CONTRAST CORRECTION

BACKGROUND OF THE INVENTION

1. Field of the Invention

The present embodiment of the invention relates generally relates to the field of electronic paper displays. More particularly, the present embodiment of the invention relates to systems for maintaining DC balance in bi-stable displays using contrast correction and methods for variable-speed page flipping with contrast correction.

2. Description of the Background Art

Several technologies have been introduced recently that provide some of the properties of paper in a display that can be updated electronically. Some of the desirable properties of paper that this type of display tries to achieve include: low power consumption, flexibility, wide viewing angle, low cost, light weight, high resolution, high contrast and readability indoors and outdoors. Because these types of displays attempt to mimic the characteristics of paper, they are referred to as electronic paper displays (EPDs) in this application. Other names for this type of display include: paper-like displays, zero power displays, e-paper and bi-stable displays.

The reflectance or color of a pixel in a bi-stable display typically changes as voltage is applied. For example, in some bi-stable displays applying a negative voltage to a pixel makes it lighter (higher reflectance) and a positive voltage makes it darker. The higher the voltage and the longer or more times that voltage is applied, the larger the change in reflectance. Electronic paper displays are typically controlled by applying a sequence of voltages to a pixel instead of just a single value like a typical LCD. These sequences of voltages are sometimes called waveforms. The control signals used to drive a pixel depend not only on the optical state the pixel is being driven to, but also on the optical state it is being driven from. Depending on the display technology, other factors may also need to be taken into consideration when choosing the waveform to drive a pixel to a desired color. Such factors can include the temperature of the display, optical state of the pixel prior to the current optical state, dwell time (i.e., the time since the pixel was last driven), and the granularity of control over voltage and duration of pulses that can be applied, and even the particular physical characteristics of a given display panel or batch of panels Failure to take these factors into account can lead to faint remnants of images that have supposedly been erased still being visible, a visual artifact known as ghosting. Some displays also have additional requirements that must be met to avoid damaging the display, such as the requirement that waveforms be DC balanced. EPD controllers will typically use relatively long waveforms (on the order of three-quarters of a second in duration) which use pulses of positive, negative and zero voltages sequenced as to maximize the number of colors or gray levels available and minimize ghosting given the current display environment.

Because of the relatively large amount of time required to update an EPD, the inventor of this patent application has developed a number of methods for transitioning between pages on an EPD in a very fast manner (less than 500 ms per page) referred to as fast page flipping. However, a number of additional problems have arisen when fast page flipping is utilized. These methods typically use short waveforms that are often (though not necessarily exclusively) unipolar, that is, waveforms that consist entirely of voltage pulses of the same sign. Images produced using such waveforms will typically exhibit more ghosting, lower contrast and smaller palette of available gray levels than those produced with longer waveforms, but are advantageous in that they can produce a page transition in a fraction of the time. Short waveforms are especially useful for rapidly displaying a sequence of pages, as one might see when flipping through a book. In this context, speed is more important than image quality. As with longer waveforms, it is important that impulse potential is not allowed to build up across the display or within a given pixel or region, as this can cause long-term damage to the display. Typically this is guaranteed by ensuring that the set of waveforms used to drive the display are DC balanced across the set, as this ensures that the impulse potential applied to any given pixel is bounded. However, this need to maintain DC balance creates new challenges that have not been previously addressed, especially when it entering and leaving fast-page-flip mode and when speeding up during fast page flipping. For example, say a display has been recently driven using a traditional (non-fast) drive scheme that has a maximum impulse potential of 12 pulses ⊕20 ms/pulse ⊕±15 V. To counteract such, this impulse potential would require a waveform of at least 12 pulses in length, because waveforms are duration-limited in the amount of impulse potential they can apply to a given pixel during a transition. The same problem exists when starting at a slower page-flip speed and gradually increasing the page rate, as one might want to do when the user holds down the "next page" button.

SUMMARY OF THE INVENTION

The present embodiment of the invention overcomes the deficiencies and limitations of the prior art by providing systems and methods for maintaining DC balance in bi-stable displays using contrast correction. In one embodiment, the system of the present embodiment of the invention includes: a DC balance module, storage for DC corrective waveforms, a page transition block feeding module and a display controller. The DC balance module is coupled to the storage to retrieve DC corrective waveforms. The DC balance module generates transitional drive schemes which drive pixels to new color values while simultaneously shifting each pixel's relative impulse potential values to be in line with those of the new speed drive scheme. The relative impulse potential for a given nominal color in a given drive scheme is defined as the integral over time of the voltage applied to drive a pixel from a standard nominal color (typically nominal white) to the nominal color within the given drive scheme. The DC balance module is responsive to input from the end-user application, the page transition block feeding module and a display frame clock and outputs the transitional drive schemes (one or more waveforms) to the waveform buffer of the display controller. The display controller in turn applies voltages to the physical media in accordance with the waveforms stored in the waveform buffer. The present embodiment of the invention is particularly advantageous because the transitional drive schemes ensure DC balance by performing contrast and color-depth correction. In particular, the transitional drive schemes lower the contrast and reduce the color depth of pixels when increasing the speed of page flipping and raise the contrast and color depth when reducing the speed of page flipping. By performing this correction, the present embodiment of the invention ensures DC balance.

The present embodiment of the invention also includes a number of novel methods including a method for variable-speed page flipping with contrast correction, a method for creating a transitional driving scheme, and a method for creating and using a transitional driving scheme.

The features and advantages described herein are not all-inclusive and many additional features and advantages will be apparent to one of ordinary skill in the art in view of the figures and description. Moreover, it should be noted that the language used in the specification has been principally selected for readability and instructional purposes, and not to limit the scope of the inventive subject matter.

BRIEF DESCRIPTION OF THE DRAWINGS

The invention is illustrated by way of example, and not by way of limitation in the figures of the accompanying drawings in which like reference numerals are used to refer to similar elements.

FIG. 3 is an example transitional driving scheme or waveform look up table for changing forward page flipping from a rate of three pages per frame to five pages per frame in accordance with the present embodiment of the invention.

DETAILED DESCRIPTION OF THE PREFERRED EMBODIMENTS

Figure 1:
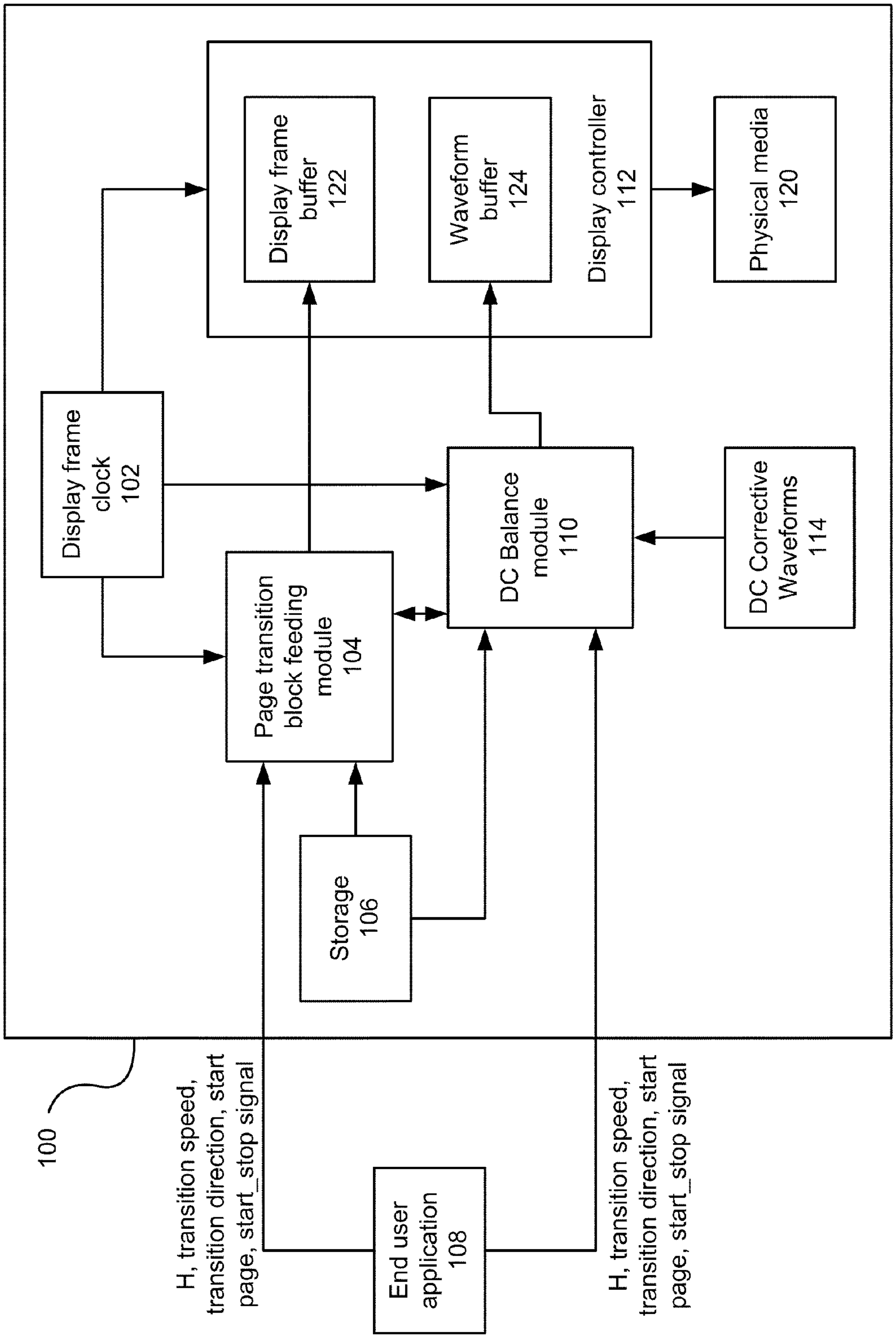
FIG. 1 is a block diagram of a system for maintaining DC balance in bi-stable displays in accordance with the present embodiment of the invention.

A system for maintaining DC balance in bi-stable displays system and methods for variable-speed page flipping with contrast correction are described below. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention. For example, the present embodiment of the invention is described in one embodiment below primarily with reference to monochrome electrophoretic displays that are driven with pulse-width modulation. However, the present embodiment of the invention applies to any type of bi-stable display for which maintaining DC balance is desirable.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment. In particular, the present embodiment of the invention is described below in the content of two distinct architectures and some of the components are operable in both architectures while others are not.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present embodiment of the invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic optical disks, read-only memories (ROMs), random access memories (RAMs), EPROMs, EEPROMs, magnetic or optical cards, or any type of media suitable for storing electronic instructions, each coupled to a computer system bus.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present embodiment of the invention is described with reference to a particular programming language. It will be appreciated that a variety of programming languages may be used to implement the teachings of the invention as described herein.

System Overview

The present embodiment of the invention uses "transitional drive schemes," which drive pixels to their new color values while simultaneously shifting each pixel's relative impulse potential values to be in line with those of the new speed's drive scheme. A transitional drive scheme is defined whenever it might be possible to switch from using one drive scheme to another that has incompatible relative impulse potentials, with one transitional drive scheme $T_{D1\rightarrow D2}$ defined for each such potential pair of DC balanced drive schemes D1 and D2. Transitional drive schemes are not themselves DC balanced, but when consistently used for a single display update (e.g. for one page-turn) before switching from one internally-DC balanced drive scheme to another, the resulting "super drive scheme" is DC balanced.

The present embodiment of the invention uses these drive schemes to ensure DC balance, but the transitional waveforms can also be thought of as performing contrast and color-depth correction, lowering the contrast and reducing the color depth of pixels when speeding up and raising contrast and color depth when slowing down. By performing this correction, the present embodiment of the invention ensures that pixels of a given nominal color will have the same relative impulse potential regardless of whether they were brought to that color under the old or new drive schemes. When used to transition between drive schemes with unipolar waveforms of different lengths, transitional waveforms have the length of the longer of the old and new speed's driving scheme, i.e. they are the same length as the previous driving scheme when speeding up, and the same length as the next driving scheme when slowing down.

System 100

FIG. 1 illustrates a system 100 for maintaining DC balance in bi-stable displays 120 and an end user application 108 according to some embodiments of the invention. The system 100 for maintaining DC balance comprises a display frame clock 102, a page transition block feeding module 104, a storage 106, a DC balance module 110, a display controller 112, a storage 114 for DC corrective waveforms and physical media 120.

The display frame clock 102 is communicatively coupled to page transition block feeding module 104, the DC balance module 110 and the display controller 112. The page transition block feeding module 104 is communicatively coupled to display frame clock 102, storage 106, end user application 108, the DC balance module 110 and display controller 112. Storage 106 is communicatively coupled to the DC balance module 110 and page transition block feeding module 104. The end user application 108 is communicatively coupled to the DC balance module 110 and page transition block feeding module 104. The DC balance module 110 is communicatively coupled to storage 106, end user application 108, display frame clock 102, the page transition block feeding module 104, the display controller 112 and the storage 114 for DC corrective waveforms. The display controller 112 is communicatively coupled to display frame clock 102, page transition block feeding module 104, the DC balance module 110 and physical media 120.

Storage 106 is a computer readable storage medium like a hard drive, random access memory, compact drive, flash memory, or a DVD. Storage 106 stores page transition file and waveform lookup tables or driving schemes. In one embodiment, a user of page transition file display system 100 transfers to storage 106 page transition files and waveform lookup tables from a download location or a computer readable storage medium. In another embodiment, other modules such a creation modules store page transition files in storage 106.

A page transition file includes a header and a sequence of page transition blocks (referred to as page transition blocks collectively), with each block representing transitions through H-2 previous pages, current page, and next page. H is the number of pages represented in each page transition block. The header comprises components such as H, CBITS, N and Num_Pix and values for these components. CBITS is the number of bits used to represent color of a pixel from a single page within a transition pixel. N is the number of pages in the document represented by page transition file. Num_Pix is the number of pixels in each page of the document. In one embodiment, the header also comprises one or more of page transition speed and page transition direction supported by the page transition file. The Page Transition block represents a transition of H document pages. Pi represents page I in the document, with the first page of the document represented as P0, the second as P1, etc. The page transition block comprises Num_Pix transition pixels, each transition pixel represented by H*CBITS bits wherein H groups of CBITS bits represent the varying colors of a pixel in H different document pages. These transition pixels are used by the display controller 112 to determine a corresponding waveform to drive the color of the corresponding pixel on physical media 120 to a desired color. In one embodiment, the transition pixel values are indices to the corresponding waveforms in the waveform lookup table and the display controller 112 uses these transition pixels to retrieve the corresponding waveform from waveform lookup table. In one embodiment, the first few and last few page transition blocks are padded with dummy pages comprising of white pixels or some other solid color or neutral pattern pixels. The dummy pages are space filers in a page transition block used when a previous page or a next page does not exist in the document but is used in page transition blocks to adhere to the page transition file format. As described above, a page transition block represents a transition of H document pages. The H document pages are pages $P_i$ to $P_{i+H-1}$. Each document page has Num_Pix pixels $q_{i,j}$ where $q_{i,j}$ represents the color of pixel j on page $P_i$. The page transition block comprises Num_Pix transition pixels $t_{i,j}$ where $t_{i,j}$ is transition pixel j on page transition block i. Each transition pixel represents a pixel's color transition on H different pages. For example, transition pixel $t_{i,j}$ represents color transition of pixel j from page $P_i$ to page $P_{i+H-1}$. The transition pixel $t_{i,j}$ therefore represent the color of pixel $q_{i,j}$ to pixel $q_{i+H-1,j}$. In one embodiment, the color of pixel $q_i$ to $q_{i+H-1}$ is represented by CBITS pixels each and the transition pixel includes CBITS bits for each of these pixel colors. The transition pixel is therefore CBITS times H bits long.

Waveform lookup tables comprise waveforms (sequence of voltages applied over time) applied by display controller 112 to drive a pixel on physical media 120 from one color to another. In one embodiment, the waveform lookup table is divided into time periods represented by frames and each frame includes a part of the waveform required to drive the pixel from one color to another. In this embodiment, the waveform lookup table maps a waveform index (represented as a transition pixel) and a frame number to a voltage that should be applied to the pixel represented by a given transition pixel for that frame. The disclosed file format supports different predefined waveform lookup tables for different transition lengths (i.e. number of frames taken by display driver to change the color of a pixel from previous state to next state), direction of page transition, values for H and CBITS for a particular page transition file, and amount of pixel history to take into account when determining a waveform to apply. Such waveform lookup tables may also be generated on-the-fly, or generated using pre-computed precursors.

End user application 108 receives user input and determines the start page from which the page transition starts, page transition speed and page transition direction. In one embodiment, the user also specifies a value for H in the end user application or end user application 108 uses a default value for H. The end user application 108 transmits start page, page transition speed, page transition direction, page transition start_stop signal, and H to page transition block feeding module 104 and the DC balance module 110.

Display frame clock 102 transmits a clock signal that synchronizes the page transition block feeding module 104, the DC balance module 110 and the display controller 112. For example, the page transition block feeding module 104 is configured to transmit a page transition block every n number of frames because the display controller 112 takes n number of frames to drive the pixel color from a previous value to desired value after receiving the desired value. Similarly, the DC balance module 110 is configured to transmit a new waveform lookup table, if required, corresponding to the number of pages that have been shown at a given speed in a given direction, to coincide with the display of a new page transition block after n number of frames. The page transition block feeding module 104 and the DC balance module 110 use the clock signal from display frame clock 102 to determine the right time when a new page transition block or waveform lookup table should be transmitted.

The page transition block feeding module 104 determines and transmits the appropriate page transition block to display controller 112. The page transition block feeding module 104 receives from end user application 108 a start page, the page transition speed selected by the end user through end user application 108, page transition direction, H, and page transition start_stop signal. The page transition start_stop signal informs the page transition block feeding module 104 to enter or exit the page transition mode and start page informs the page transition block feeding module 104 to start the page transition from page numbered start page. In one embodiment, the end-user application 108 is responsible for ensuring that the start page is currently being displayed. In another embodiment, the page transition block feeding module 104 transmits the start page to display frame buffer 122 of display controller 112 and the display controller 112 uses prior art methods to display that page.

In one embodiment, the end user application 108 transmits to page transition block feeding module 104 the page transition file or an address of page transition file. The page transition block feeding module 104 then determines part of the above mentioned information from header of page transition file. In another embodiment, end user application 108 transmits a document identifier to page transition block feeding module 104 and page transition block feeding module 104 determines the page transition file associated with the received document. In one embodiment, the page transition block feeding module 104 determines the page transition file corresponding to the received page transition speed, page transition direction or H. In yet another embodiment, the page transition block feeding module 104 is preconfigured with or determines from a configuration file the H and CBITS supported by display controller 112. The page transition block feeding module 104 determines a corresponding page transition file that supports the H and CBITS of display controller 112.

Regardless of how the page transition block feeding module 104 determines the appropriate page transition file, the page transition block feeding module 104 determines the appropriate page transition block using start page and one or more from the group of page transition speed, page transition direction and H. The page transition block feeding module 104 transmits the determined page transition block to display controller 112. In one embodiment, page transition block feeding module 104 also transmits an index length for page transition block to display controller 112. Index length equals H times CBITS and informs the display controller 112 about the length of transition pixel in page transition blocks. In another embodiment, display controller 112 is preconfigured with an index length and the page transition block feeding module 112 transmits a page transition block that corresponds to the index length supported by display controller 112.

Display controller 112 uses the received page transition blocks, waveform lookup table, and index length to lookup waveforms, apply them to physical media 120, and drive the pixel colors on physical media 120 to desired colors. In one embodiment, the display controller 112 reads the transition pixel from a page transition block and uses the value of transition pixel as an index into the waveform lookup table to determine the appropriate waveform. The display controller 112 then applies the determined waveform to physical media 120 and drives the pixel color to desired color. In one embodiment, display controller 112 is pre-configured with an index length and display controller 112 does not receive an index length. The page transition block determination module 104 in this embodiment determines the index length supported by display controller 112 and transmits page transition blocks supporting that index length. Display controller 112 comprises display frame buffer 122 and waveform buffer 124. In one embodiment, the display frame buffer 122 and waveform buffer 124 are portions of random access memory in display controller 112. Display frame buffer 122 is communicatively coupled to page transition block feeding module 104 and receives page transition blocks from page transition block feeding module 104. Waveform buffer 124 is communicatively coupled to DC balance module 110 and receives a waveform lookup table corresponding to the page transition block received in display frame buffer 122.

Physical media 120 is the microcapsule layer 120 of an electronic paper display.

The DC balance module 110 determines and transmits to waveform buffer 124 a waveform lookup table or driving scheme depending on the speed and direction of page flipping. In one mode of operation where the user is transitioning between pages at a fixed rate, the DC balance module 110 operates as a waveform lookup table selection module as will be described below. In another second mode of operation where the end-user application 108 is changing the rate of transition between pages, the DC balance module 110 stores transitional drive schemes in the waveform buffer 124. In a third mode of operation, the DC balance module 110 creates DC corrective waveforms and stores them in storage 114 or uses them on the fly and stores them in the waveform buffer 124.

The DC balance module 110 operates as a waveform lookup table selection module and determines and transmits to waveform buffer 124 a waveform lookup table corresponding to one or more of speed, direction, values of H and CBITS, and number of page transition blocks that have been seen since page flipping was started for the current speed and direction. The waveform lookup table selection module receives from end user application 108 the start page, page transition speed, page transition direction, H, and page transition start_stop signal. In one embodiment, the end user application 108 transmits to waveform lookup table selection module page transition file or an address of page transition file. The waveform lookup table selection module then determines part of the above mentioned information from header of page transition file. In another embodiment, the page transition file is determined by page transition block determination module 104 and page transition block determination module 104 transmits to waveform lookup table selection module the page transition file or an address of page transition file. The waveform lookup table selection module uses one or more from the group of page transition speed, page transition direction and H to determine the appropriate waveform lookup table that corresponds to the transmitted page transition block. For example, the waveform lookup table selection module selects one waveform lookup table for displaying five page transitions in a second and a different waveform lookup table for displaying ten page transitions in a second. When the page transition start stop signal is turned on, the waveform lookup table selection module selects and transmits a predefined waveform lookup table to waveform buffer 124. This waveform lookup table is selected based on the received page transition speed and page transition direction. Because this is the first page transition performed at the page transition speed, the selected waveform lookup table will account for the current and next color for a pixel and ignore any prior history encoded in a transition pixel. As history is accumulated, waveform lookup table selection module determines and transmits different waveform tables that account for the additional history. Eventually, waveform lookup table selection module transmits the waveform lookup table that accounts for as much history as encoded in the page transition block.

The DC balance module 110 is also used to stores transitional drive schemes in the waveform buffer 124. The DC balance module 110 receives from end user application 108 the start page, page transition speed, page transition direction, H, and page transition start_stop signal. In this mode of operation, the DC balance module 110 determines whether the rate of page flipping is varying and if so, stores transitional drive schemes in the waveform buffer 124. These transitional drive schemes are advantageously DC balanced. The operation of the DC balance module 110 in this mode can best be understood with reference to FIGS. 2*a*-4, and 7 described below. The DC balance module 110 implements the process described in those figures.

In one embodiment, the DC balance module 110 also generates the transitional drive schemes. The DC balance module 110 in this mode cooperates with the storage 114 for DC corrective waveforms to store the transitional drive schemes for later use. Alternatively, the DC balance module 110 generates the transitional drive schemes on the fly and uses them. The operation of the DC balance module 110 in this mode can best be understood with reference to FIGS. 5 and 6 described below. The DC balance module 110 implements the process described in FIGS. 5 and 6.

The storage 114 for DC corrective waveforms is a storage medium of a conventional type similar to that described above with reference to storage 106.

Transitional Driving Schemes

Figure 2A:
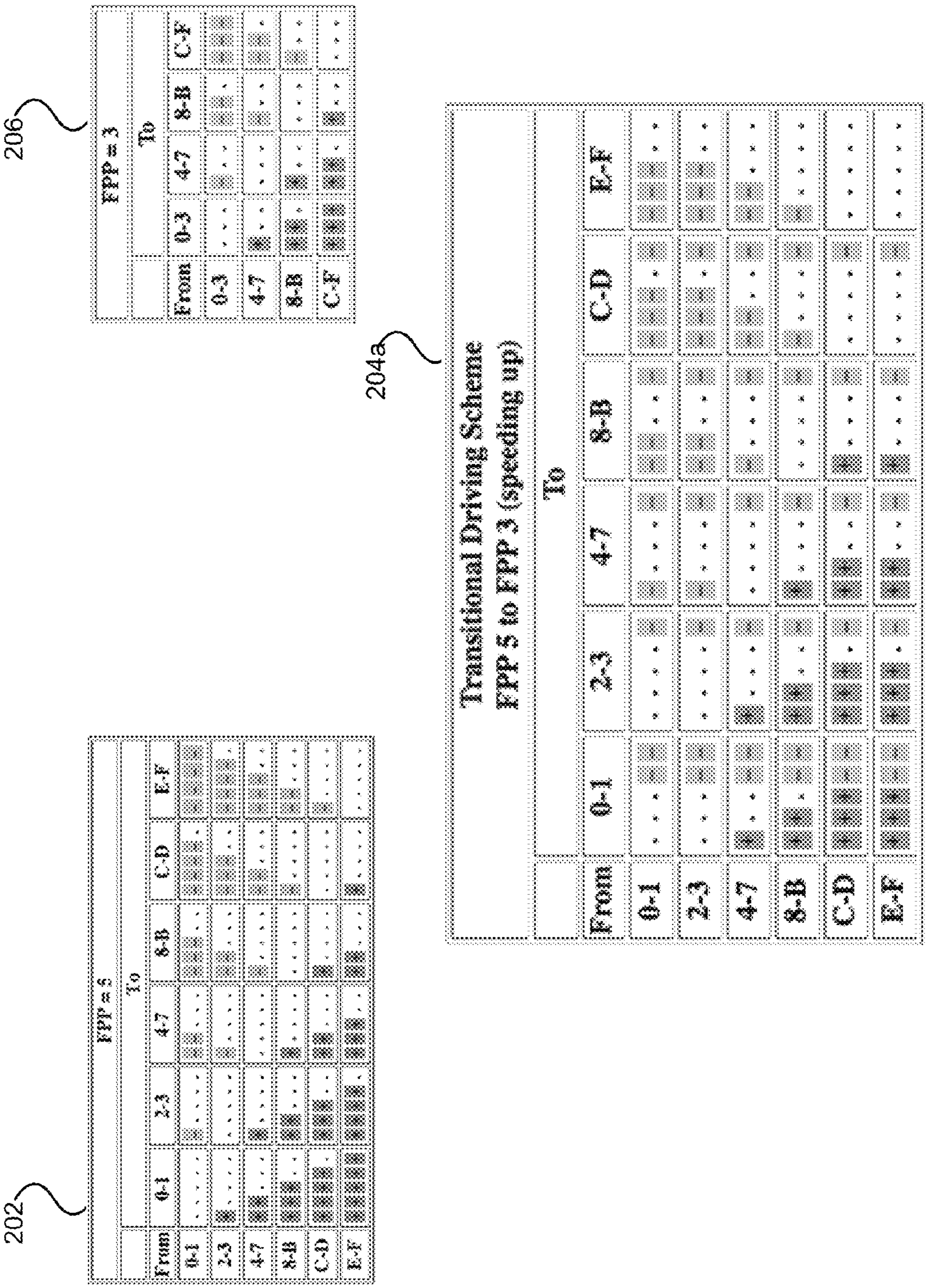
FIGS. 2A and 2C are example transitional driving schemes or waveform look up tables for changing forward page flipping from a rate of five pages per frame to three pages per frame in accordance with a first embodiment of the invention.

FIG. 2A shows a plurality of drive schemes 202, 204*a* and 206 in accordance with the present embodiment of the invention. In accordance with the present embodiment of the invention, driving scheme is implemented using one or more waveform lookup tables that map a pixel's current optical state and desired optical state to a waveform that should be applied to achieve that transition. Such tables might also account for other variables such as optical states prior to the current optical state. A driving scheme might also define multiple waveform lookup tables for different application needs (e.g. one for grayscale updates and another for monochrome) and for different environmental factors such as temperature of the display.

The present embodiment of the invention advantageously creates each waveform lookup table within a driving scheme so that it is not only DC balanced with respect to itself, but also with respect to every other table within the driving scheme. For example, if a driving scheme defines both grayscale and monochrome update modes, then driving a pixel through a sequence of nominal colors that begins and ends at the same color should always result in a net zero impulse potential, even if some transitions used the grayscale mode and some used the monochrome mode. The present embodiment of the invention accomplishes this by constructing all waveform lookup tables within a given driving scheme such that they have the same relative impulse potential for each nominal color.

While the present embodiment of the invention is not strictly limited to the embodiments disclosed herein, the present embodiment of the invention works best when all non-transitional drive schemes used in fast-page-flipping mode have unipolar waveforms and hierarchical color binning. In unipolar waveforms, each waveform in the drive scheme contains only pulses of zero volts and one of the two signed voltages. In these schemes, waveforms that transition between the two extremes (nominal white to nominal black, and vice versa) consist entirely of pulses of one of the two signed pulses up to the length of the waveform, while intermediate colors consist of a combination of zero volts and the appropriately-signed voltage. The reason for this limitation is that more complex drive schemes can and often do have impulse potentials between colors that are not at all proportional to their differences in reflectivity. In hierarchical color binning, each set of nominal colors that are mapped to the same display color in one drive scheme are a (not necessarily strict) superset of the sets of nominal colors mapped to the same display colors in the drive scheme with the next longest waveform length. This restriction is to insure that colors are not split into different bins by the two drive schemes, which could also cause color inversion (a darker nominal color having higher reflectivity than a lighter nominal color) after correcting for impulse potential.

As noted above, the present embodiment of the invention uses "transitional drive schemes," which drive pixels to their new color values while simultaneously shifting each pixel's impulse potential values to be in line with those of the new speed's drive scheme. In particular, the FIG. 2A three drive schemes 202, 204*a* and 206. The first drive scheme 202 shows a waveform lookup table for a fast page flipping waveform length of five frames. The second drive scheme 204*a* shows a waveform lookup table for a transitional drive scheme when the rate of page flipping is changing from five frames to three frames. The third drive scheme 206 shows a waveform lookup table for a fast page flipping waveform length of three frames. For the example drive schemes 202, 204*a* and 206 shown in FIG. 2A, the drive schemes 202, 204*a* and 206 are defined by the following waveform lookup tables, with waveform lengths of five and three frames respectively. In the tables, characters represent waveform frames with '.' representing 0 Volts, '+' representing voltage going towards black and '−' representing voltage that drives pixels towards white. Nominal color values are indicated by hexadecimal numbers ranging between 0 (nominal black) and F (nominal white). When nominal colors are binned such that they are treated the same way (and thus map to the same actual color) by a particular waveform lookup table they are shown as a range. FIGS. 2C and 2D show the same waveform lookup tables displayed with the bins broken out into two nominal colors per actual color, regardless of the table's binning.

The transitional waveform lookup table 204*a* is for changing between forward flipping at five frames per page (about 10 pages per second) to three frames per page (about 16.6 pages per second). Note that the number of gray levels supported by the two page-flip rates, and thus how each of the 16 nominal colors is binned, are different. Each waveform in the transitional drive scheme 204*a* has the number of pulses of the longer of the two drive schemes (in this case, five), with the first three pulses containing a copy of the FPP=3 drive scheme (with binned colors broken out as necessary), the shorter of the two drive schemes. The remaining two pulses of each waveform perform the contrast correction for each color, applying a negative voltage (towards white) for between zero and two pulses as necessary to make up the difference between the two schemes. In other words, the remaining two pulses of each waveform are set to values to perform impulse potential correction.

Figure 2B:
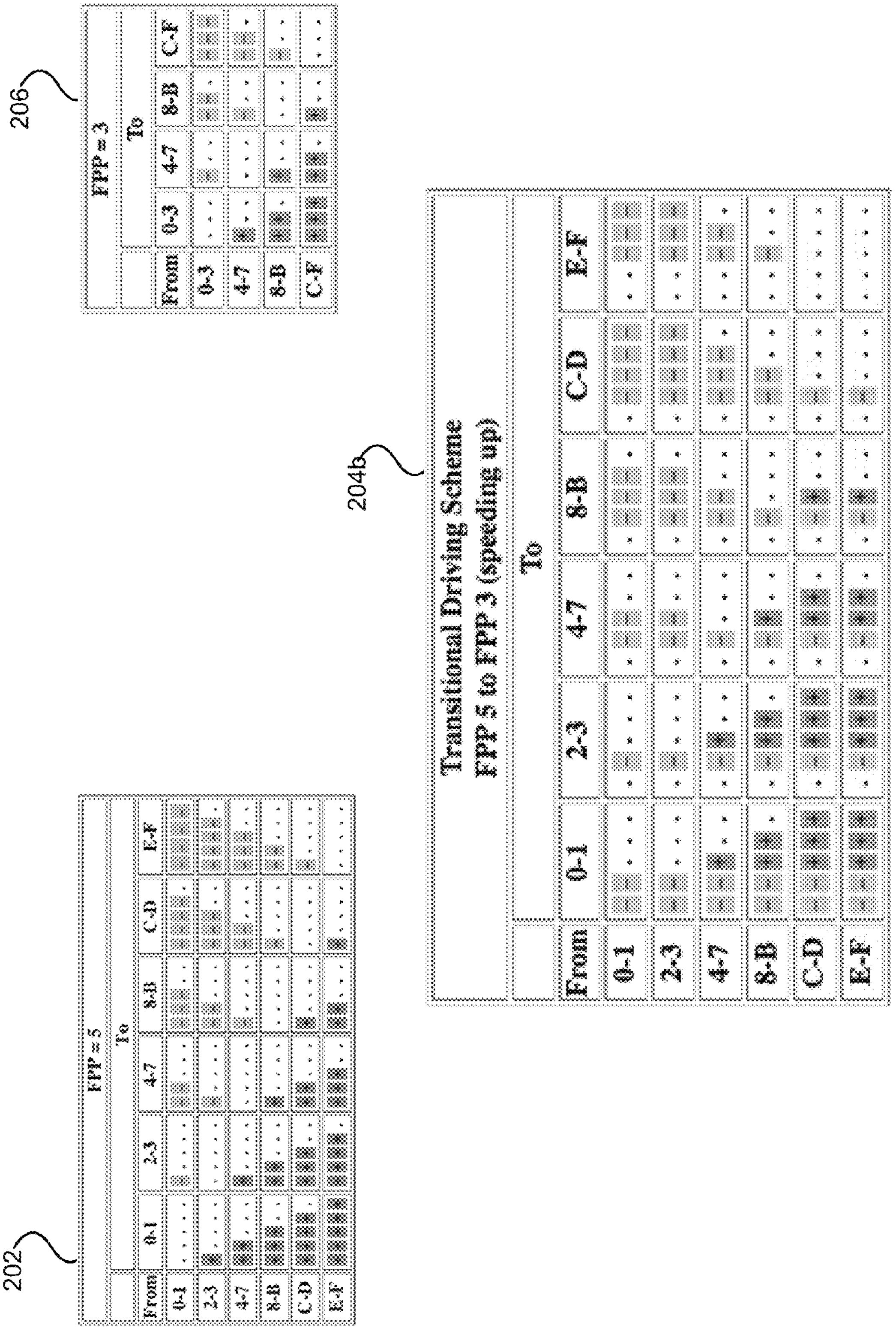
FIGS. 2B and 2D are example transitional driving schemes or waveform look up tables for changing forward page flipping from a rate of five pages per frame to three pages per frame in accordance with a second embodiment of the invention.
Figure 2C:
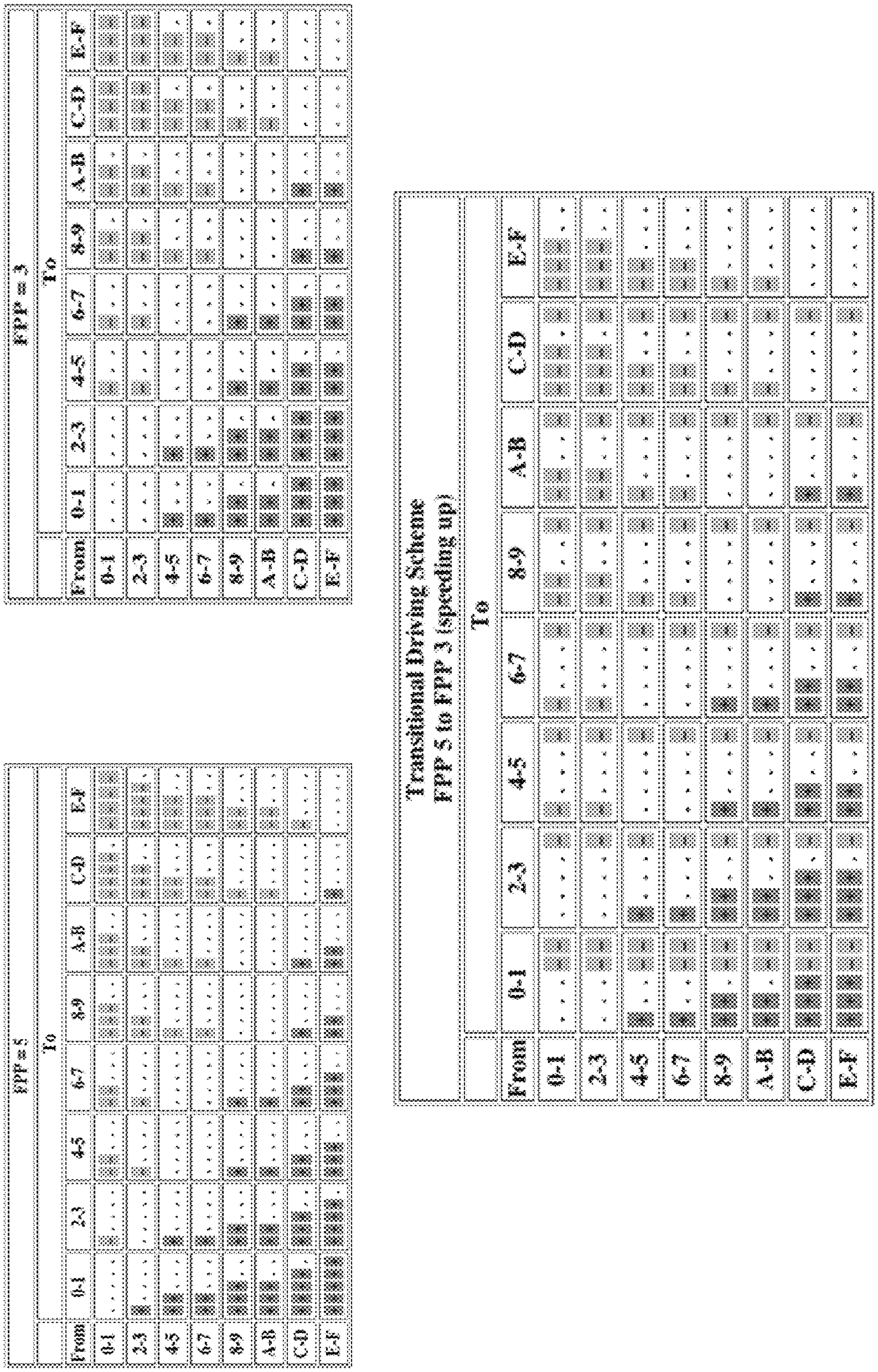
Figure 2D:
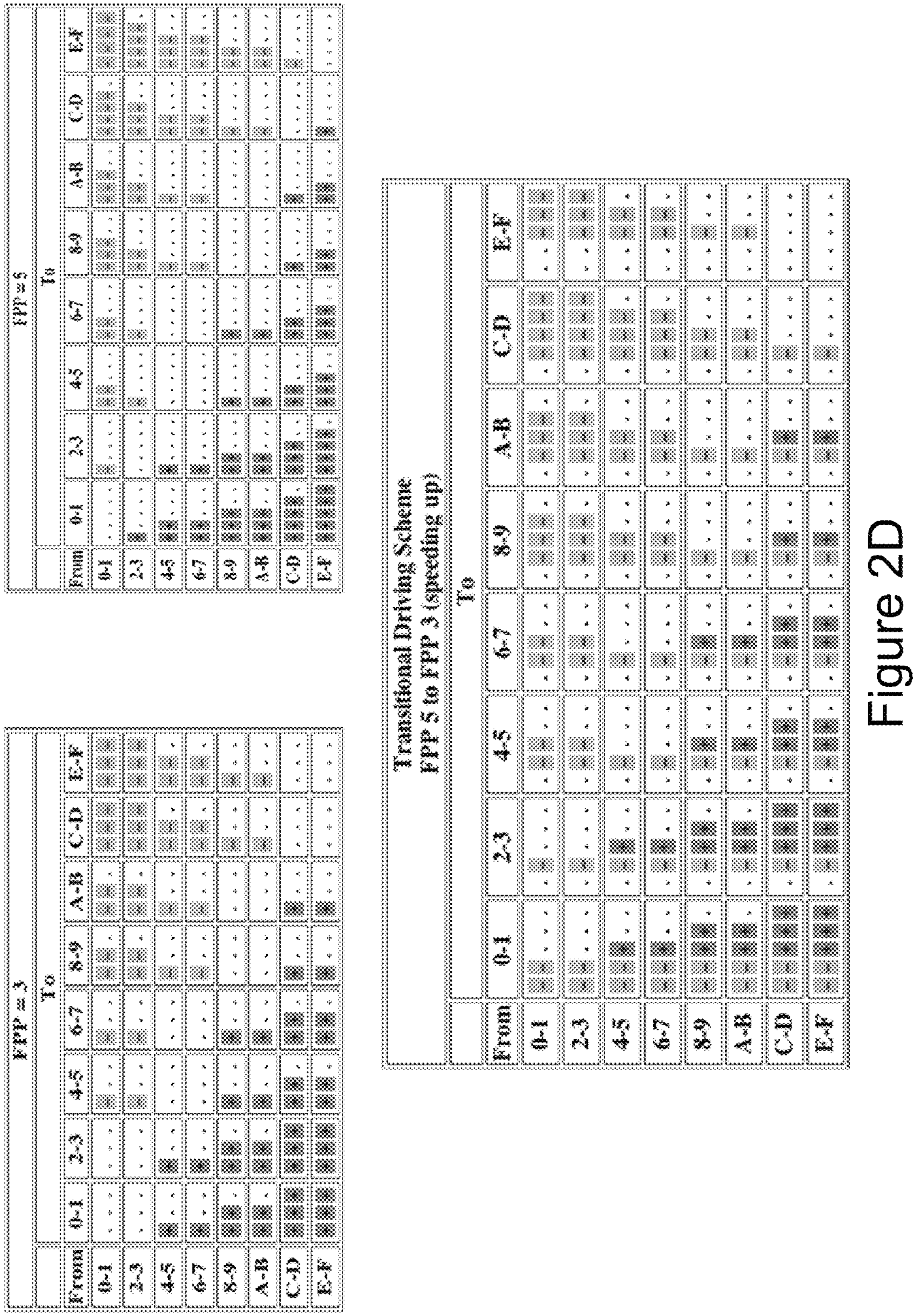

Referring now to FIG. 2B, an alternate embodiment of the transitional waveform lookup table 204*b* is shown. FIG. 2B like FIG. 2A shows a plurality of driving schemes 202, 204*b* and 206. The first and third drive schemes 202, 206 are identical to those of FIG. 2A. The first drive scheme 202 shows a waveform lookup table for a fast page flipping waveform length of five frames. The third drive scheme 206 shows a waveform lookup table for a fast page flipping waveform length of three frames. The second drive scheme 204*b*, however, in this embodiment has the order of the drive and correction waveforms switched. Each waveform in the transitional drive scheme 204*b* has two pulses to perform the contrast correction followed by the three pulses containing a copy of the FPP=3 drive scheme. The correction to ensure DC balance may be added before or after the drive waveform. Those skilled in the art will recognize that the contrast correction pulses can be added to the waveform in a variety of other matters such as intermingled within the drive pulses.

Referring now to FIG. 3, the transitional waveform lookup table 302 for changing between forward flipping at three frames per page (about 16.6 pages per second) to five frames per page (about 10 pages per second), slowing down, is shown. Those skilled in the art will recognize that the impulse potential correction pulses (the first two pulses of each waveform) in lookup table 302 are the complement of waveform lookup table 204*a*, the impulse potential correction pulses of 204*b*, while the remaining pulses in each waveform are the same as in waveform lookup table 204*b*. Similar to waveform lookup table 204*b*, an alternate embodiment of transitional waveform lookup table 302 could position the last two correction pulses at the end of the waveform instead of the beginning Methods Referring now to FIGS. 4A-7, the methods of the present embodiment of the invention will be described in more detail.

Figure 4A:
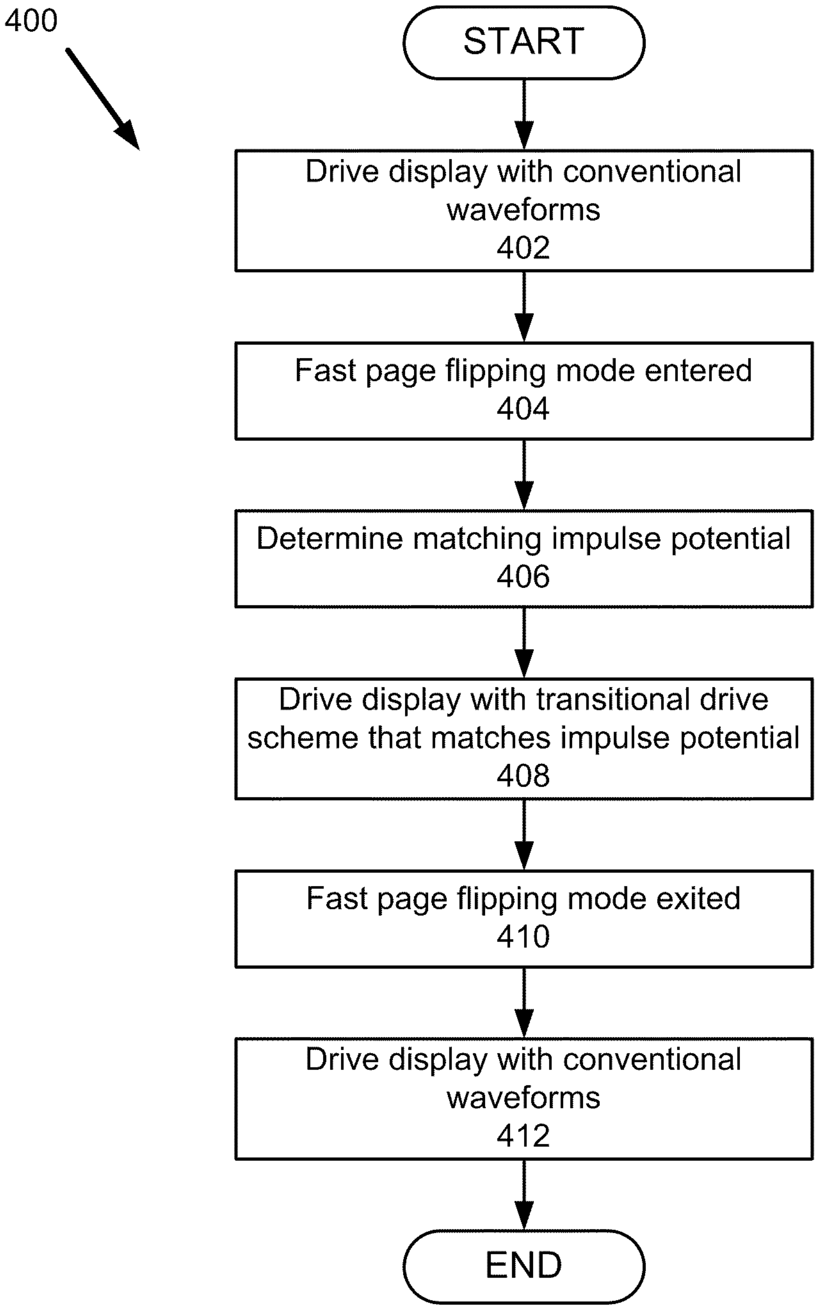
FIG. 4A is a flow chart illustrating a method for variable-speed page flipping with contrast correction in accordance with a first embodiment of the invention.

Referring now to FIG. 4A, an embodiment of a method 400 for variable-speed page flipping with contrast correction in accordance with the present embodiment of the invention will be described. The method 400 begins by driving 402 the display with conventional waveforms according to a first driving scheme. These waveforms could be for changing the display one page at a time or for changing the display using fast page flipping but at a fixed rate of page transition. The first driving scheme has a first rate of page transition. Methods for storing waveforms into the waveform buffer 124 of the display controller 112 have been described above with reference to FIG. 1. This step is essentially operating the DC balance module 110 as a waveform lookup table selection module as has been described above. Next, the method determines 404 whether the user has entered the fast page flipping mode and whether the user is varying the rate at which page flipping is going to occur. In one embodiment, this is determined based upon input from the user such as how long the user has pressed the page advance button. For example, the user may press the page advance button for a limited amount of time to cause the display to advance to the next page of a document. However, if the user continues to press the page advance button, the system 100 increases the rate at which the display transitions between pages. In other words, the system 100 increases the page flipping rate the longer the user press the advance page button. Once it has been determined that the page flipping mode is entered 404, the method 400 continues to determine 406 a matching impulse potential corresponding to the transitional page rate.

In other words, in order to ensure DC balancing is achieved with the transitional waveform, the system 100 determines the page rates between which the display is changing. Transitions between different page rates may produce different impulse potentials. In order to modify the waveform to adjust for these differential impulse potentials, the method 400 determines the matching impulse potential in step 406. For example, as shown below in Table 1, the relative impulse potentials for three driving schemes and the differences between them are shown.

TABLE 1

| Nominal Color (16-bit) | $IP_{FPP=5}$ | $IP_{FPP=4}$ | $IP_{FPP=3}$ | $IP_{FPP=5} - IP_{FPP=4}$ | $IP_{FPP=54} - IP_{FPP=43}$ | $IP_{FPP=5} - IP_{FPP=3}$ |
|---|---|---|---|---|---|---|
| 0x0 | 5 | 4 | 3 | −1 | −1 | −2 |
| 0x1 | 5 | 4 | 3 | −1 | −1 | −2 |
| 0x2 | 4 | 3 | 3 | −1 | 0 | −1 |
| 0x3 | 4 | 3 | 3 | −1 | 0 | −1 |
| 0x4 | 3 | 2 | 2 | −1 | 0 | −1 |
| 0x5 | 3 | 2 | 2 | −1 | 0 | −1 |
| 0x6 | 3 | 2 | 2 | −1 | 0 | −1 |
| 0x7 | 3 | 2 | 2 | −1 | 0 | −1 |
| 0x8 | 2 | 1 | 1 | −1 | 0 | −1 |
| 0x9 | 2 | 1 | 1 | −1 | 0 | −1 |
| 0xA | 2 | 1 | 1 | −1 | 0 | −1 |
| 0xB | 2 | 1 | 1 | −1 | 0 | −1 |
| 0xC | 1 | 0 | 0 | −1 | 0 | −1 |
| 0xD | 1 | 0 | 0 | −1 | 0 | −1 |
| 0xE | 0 | 0 | 0 | 0 | 0 | 0 |
| 0xF | 0 | 0 | 0 | 0 | 0 | 0 |

Next the method 400 determines 408 a transitional drive scheme that matches the impulse potential, and drives 408 the display with that transitional drive scheme. In one embodiment, the transitional drive scheme is retrieved from storage 114 of the DC corrective waveforms. In another embodiment, the transitional drive scheme is generated by the DC balance module 110 as will be described below in more detail with reference to FIGS. 5 and 6. Next the method 400 determines whether the fast page flipping mode has been exited. Those skilled in the art will recognize that because of the novel construction of the transitional driving scheme of the present embodiment of the invention, driving the display with the transitional driving scheme changes the relative impulse potential of at least one nominal color. In other words, the relative impulse potential of at least one nominal color is different after driving the display with the transitional driving scheme than it was before. If the user is no longer transitioning between variable rates of page flipping, the fast page flipping mode can be exited and the display updated using waveforms of a conventional type. In step 412, the method returns to updating the waveform buffer 124 of the display controller 112 in a conventional manner, however, now using a second driving scheme with second page transition rate that is different from the first page transition rate. Those skilled the art will recognize that while the method of FIG. 4 only shows one transition from a conventional state to a state where transitional drive scheme is used and then back to using conventional waveforms, there may be many number of transitions between page flipping rates, and thus the use of this method may be repeated numerous times.

Figure 4B:
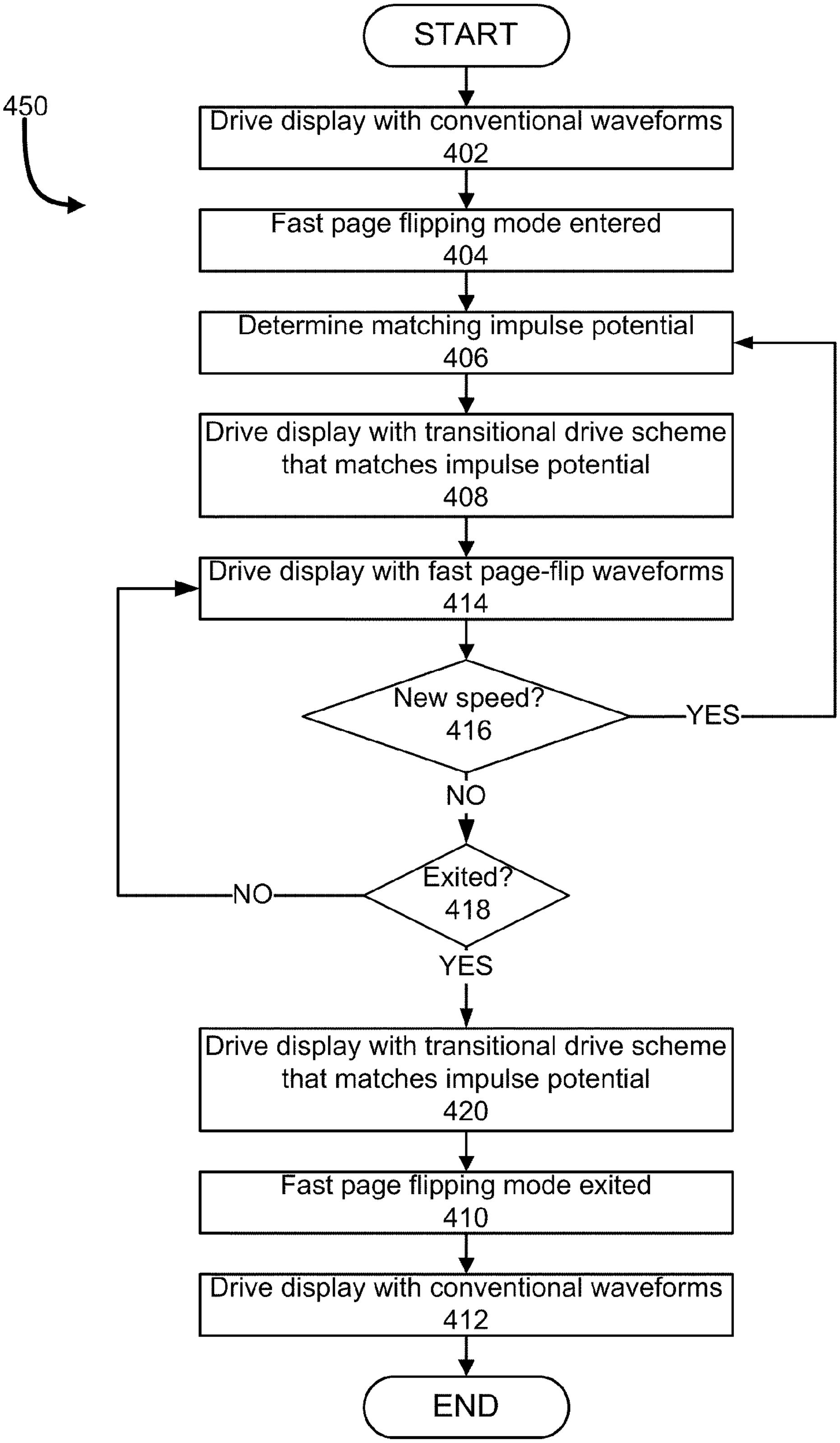
FIG. 4B is a flow chart illustrating a method for variable-speed page flipping with contrast correction in accordance with a second embodiment of the invention.

FIG. 4B shows another embodiment of the method 450 for variable-speed page flipping with contrast correction. In this embodiment, the system performs page flipping in addition to the contrast correction. Like steps with the same or similar functionality have been labeled with similar reference numbers. The 450 method begins by performing steps 402, 404, 406, 408 as described above. Then the method 450 continues to drive 414 the display with fast page-flipping waveforms. Then the method 450 determines whether the page flipping is transitioning to a new speed. If so the method returns to step 406 and loops through steps 408, 410 and 4112. However, if input was not received to change the speed, then the method 450 determines whether a command to exit page flipping mode has been received. If not the method 405 loops to step 414 and repeats steps 416 and 418. On the other hand, if a command to exit page flipping mode has been received, the method 450 drives 420 the display with the transitional drive scheme that matches the impulse potential after which method 450 completes by performing step 410 and 412 as has been described above.

Figure 5:
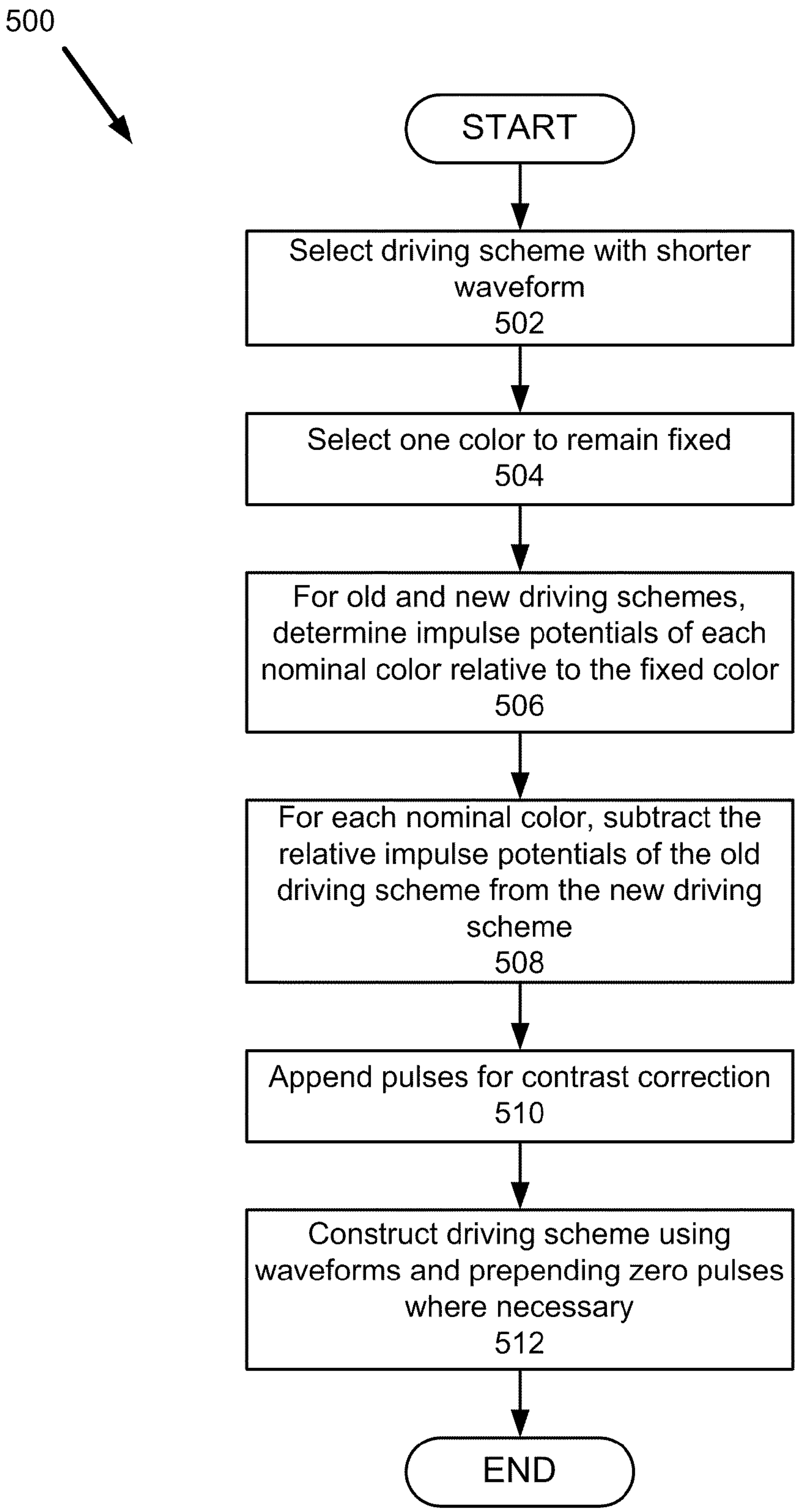
FIG. 5 is a flow chart illustrating a method for creating a transitional driving scheme in accordance with a first embodiment of the invention.

Referring now to FIG. 5, a method 500 for creating a transitional driving scheme in accordance with the present embodiment of the invention is described. The method 500 starts with two driving schemes D1 and D2 and creates a transitional driving scheme $T_{D1 \rightarrow D2}$. The method 500 begins by selecting 502 the driving scheme with the shorter waveforms. When speeding up, this will be the driving scheme being transitioned to, when slowing down this will be the driving scheme being transitioned from. For example, the transitional driving scheme 204*a* of FIG. 2A (speeding up) is transitioning from FPP 5 to FFP 3 and selects the driving scheme FPP=3 206 to be included in the transitional driving scheme 204*a*. The method continues by selecting 504 one color to remain fixed. In other words, one color is picked to remain fixed (i.e., for which the difference in impulse potential between the old and new driving schemes for that color should be pinned to zero). In one embodiment when displaying text, the lightest color for both driving schemes is selected to remain fixed because that ensures that the majority of pixels (which are white) will remain constant. In another embodiment, the pixel color that is most represented in both the previous and desired image during the transitional waveform is selected to remain fixed (though in that case the system requires a buffer to store the selected color so the proper adjustment can be made when transitioning back in the other direction later). Then the method 500 for both the old and new driving schemes, computes 506 the impulse potentials of each nominal color relative to the fixed color chosen in step 504. Note that any nominal colors that map to the same waveform (and thus display color) will have the same relative impulse potential for that driving scheme. For example, a driving scheme that only supports four distinct colors might map 4-bit nominal color 0x0, 0x1, 0x2 and 0x3 to the same display color, so these would all have the same relative impulse potential for that driving scheme. Next, the method 500 subtracts 508 the relative impulse potential of the old driving scheme from that of the new driving scheme for each nominal color. For example, see the values in 3 rightmost columns of Table 1 above as example resulting values. Then the method 500 appends 510 pluses that correct contrast. For each waveform mapping $C_1 \rightarrow C_2$ in the transitional driving scheme, the method appends 510 pluses that correct contrast by adding pulses equal to the difference in relative impulse potential for $C_1 \rightarrow C_2$ as computed in step 508, with the polarity of the pulses equal to the sign of the computed difference and the number of pulses equal to the absolute value. Finally, the transitional driving scheme is constructed 512 using waveforms and prepending zero pulses where necessary. In other words, all waveforms in the constructed driving scheme are made the same length, the length of waveforms in the longer of the old and new driving scheme, by prepending zero voltage pulses where necessary. The end result for the example transitional driving scheme from $T_{FPP=5 \rightarrow FPP=3}$ 204*a* is shown in FIG. 2A, and its complement $T_{FPP=3 \rightarrow FPP=5}$ 303 is shown in FIG. 3 (nominal colors that map to the same waveform have been binned for clarity).

Figure 6:
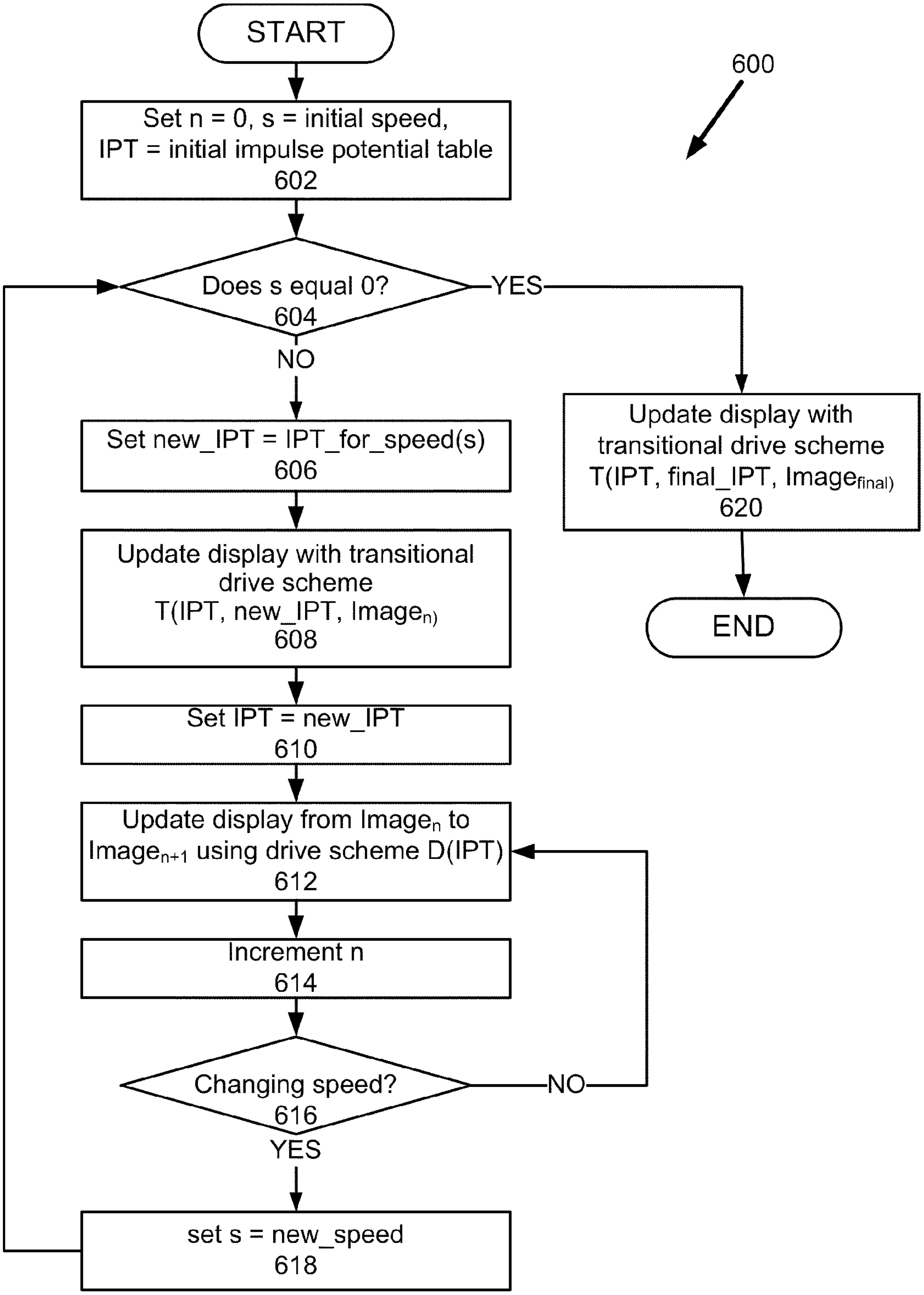
FIG. 6 is a flow chart illustrating a method for creating and using a transitional driving scheme in accordance with a second embodiment of the invention.

Referring now to FIG. 6, a second embodiment of the method 600 for creating and using a transitional driving scheme in accordance with the present embodiment of the invention is described. In the present embodiment of the invention, the method of FIG. 6 is performed by the DC balance module 110. The method begins by setting 602 initial values for creation of transitional drive schemes. For example, a variable n in is set to zero, the variable s is set to the initial transition speed, and a variable IPT is set to be equal to the initial impulse potential table, which is the impulse potential table for the current drive scheme (i.e. the drive scheme used before fast page flipping was initiated). As described above, the impulse potential table maps each possible nominal color to the impulse potential which must be applied to drive a pixel from a standard fixed nominal color (typically nominal white) to that nominal color. Next the method 600 determines 604 whether a stop has been requested, as indicated by s being set to 0. If not, the method continues in step 606 to set a variable new_IPT equal to the IPT for the current speed to which the display has been updated. For example, in the first pass of the method, the new_IPT is set to be the IPT for the waveforms that drive pixels at the initial speed. Next the method 600 updates 608 the display with a new transitional drive scheme T where the transitional drive scheme uses the values of IPT, new_IPT, and $\text{Image}_n$. Once the display has been updated 608, the method 600 continues to set IPT equal to new_IPT. The method 600 then updates 612 the display from $\text{Image}_n$ to $\text{Image}_{n+1}$ using the drive scheme D(IPTs) where D(s) is the drive scheme that drives pixels at the current speed The method 600 continues by incrementing 614 the value of n. Next, the method determines 616 whether the user has changed speeds. If not, the method returns to step 612 and continues to update the display using the waveforms for the current speed. On the other hand, if the user has changed speeds, the method 600 continues by setting 618 the variable s equal to the new speed. Then the method continues to determine 604 whether the variable s (the new speed to which the variable is set to) is equal to zero. If so, the user is no longer performing fast page flipping (because the speed is equal to zero, indicating a stop has been requested) and the method 600 begins to update 620 the display with the transitional drive scheme T where the transitional drive scheme uses the values of IPT, final_IPT, $\text{Image}_{final}$-, where final_IPT is the IPT for the drive scheme to be used once fast page flipping has completed. After step 620, the method is complete and ends.

Figure 7:
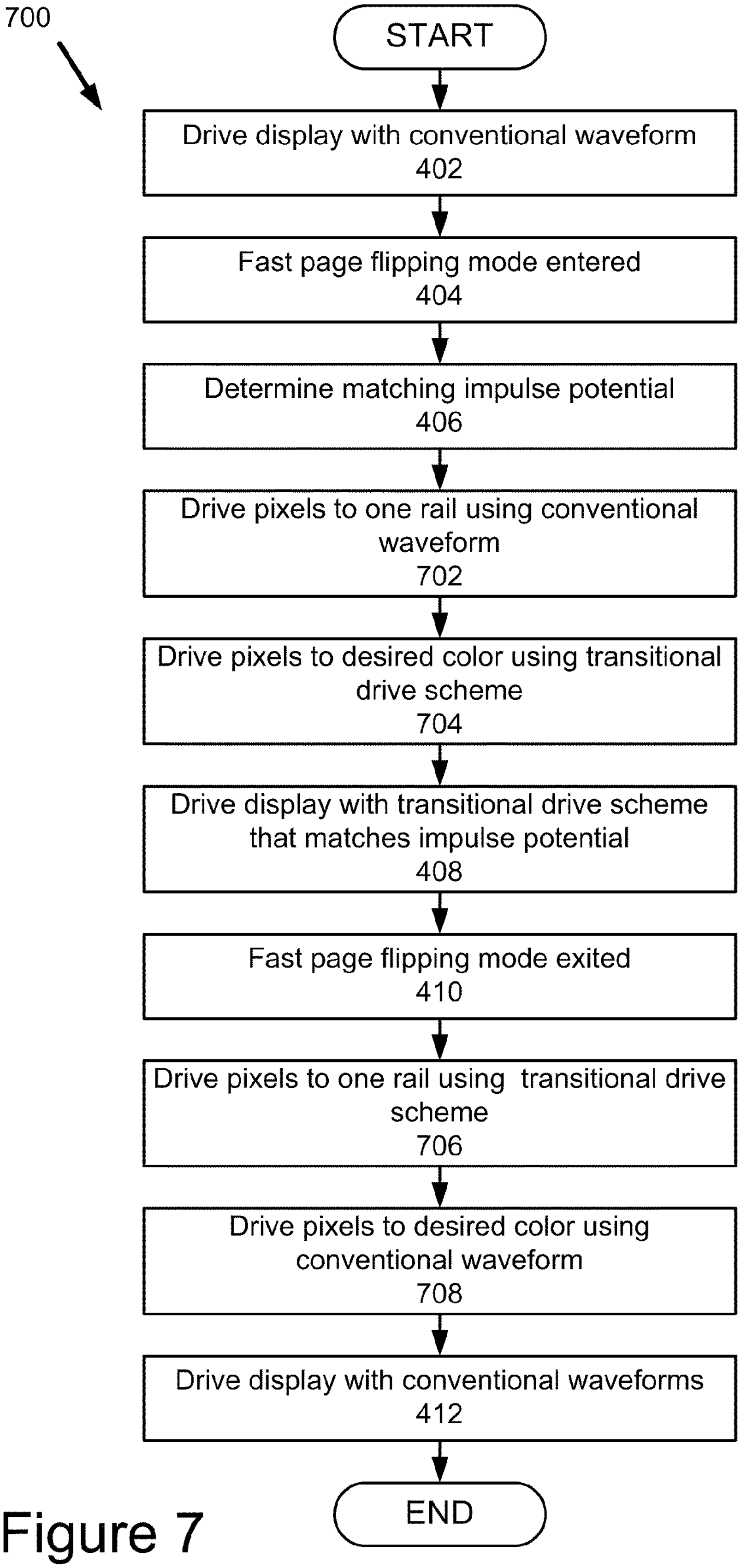
FIG. 7 is a flow chart illustrating the method for variable-speed page flipping with contrast correction in accordance with a second embodiment of the invention.

Referring now to FIG. 7, a second embodiment of the method 700 for variable-speed page flipping with contrast correction in accordance with the present embodiment of the invention will be described. It should be noted that the second embodiment of the method 700 is similar to the method described above with reference to FIG. 4. Therefore, steps with the same or similar functionality have the same reference numbers as described above with reference to FIG. 4. One of the differences between the method of FIG. 7 and FIG. 4 is that the method 700 of FIG. 7 ensures that there is not a color inversion problem when entering and exiting fast page flipping mode for nonlinear drive schemes. The method begins as described above with reference to FIG. 4 by driving 402 the display with the conventional waveform, entering 404 the fast page flipping mode, and determining 406 matching impulse potentials. Next the method 700 drives 702 the pixels to an extreme optical state (black or white), sometimes called a "rail," using the conventional waveform. In other words, all the pixels are driven to match the impulse potential of one rail. For example, typically all the pixels are driven to single color such as white. Then in step 704, the method 700 drives the pixels to the desired color but using the transitional drive scheme. For example, in one embodiment the method 700 drives all the pixels using a waveform that drives current color to white (0XF) in a "clearing" waveform, followed by the waveform the drives the pixel to the desired color using a unipolar drive scheme. After step 704, method 700 drives 408 the display with the transitional drive scheme that matches the input potential determined in step 406, and continues to do so until the fast page flipping mode is exited 410. Next, the method 700 drives 706 all the pixels to one rail using the transitional drive scheme. Then the pixels are driven 704 to the desired color using the conventional waveform. After step 704 the method completes by continuing to drive 412 the display with the conventional waveforms. Those skilled in the art will recognize modifications to the method 700 of FIG. 7. For example, rather than driving the rails to match the input potential of one rail both upon entry and exit of the fast page flipping mode, an alternate embodiment may only drive the pixels to one rail at exit from fast page flipping mode or only add entry into fast pace of the mode. An alternate embodiment might also drive pixels to the rail nearest to the color that will subsequently be driven to.

The foregoing description of the present embodiment of the invention has been presented for the purposes of illustration and description. It is not intended to be exhaustive or to limit the present embodiment of the invention to the precise form disclosed. Many modifications and variations are possible in light of the above teaching. It is intended that the scope of the present embodiment of the invention be limited not by this detailed description, but rather by the claims of this application. As will be understood by those familiar with the art, the present embodiment of the invention may be embodied in other specific forms without departing from the spirit or essential characteristics thereof. Likewise, the particular naming and division of the modules, routines, features, attributes, methodologies and other aspects are not mandatory or significant, and the mechanisms that implement the present embodiment of the invention or its features may have different names, divisions and/or formats. Furthermore, as will be apparent to one of ordinary skill in the relevant art, the modules, routines, features, attributes, methodologies and other aspects of the present embodiment of the invention can be implemented as software, hardware, firmware or any combination of the three. Also, wherever a component, an example of which is a module, of the present embodiment of the invention is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present embodiment of the invention is in no way limited to implementation in any specific programming language, or for any specific operating system or environment. Accordingly, the disclosure of the present embodiment of the invention is intended to be illustrative, but not limiting, of the scope of the present embodiment of the invention, which is set forth in the following claims.

The invention claimed is:

1. A method comprising:

driving an electronic paper display with a first pixel driving scheme having a first rate of page transition;

determining a second driving scheme having a second rate of page transition;

in response to determining that the rate of page transition is varying from the rate to the second rate, determining a transitional pixel driving scheme, including a drive waveform and a contrast correction waveform, by:

selecting a waveform length for the transitional pixel driving scheme, wherein the waveform length for the transitional pixel driving scheme is equal in length to a longer waveform length of the first and second pixel driving schemes;

using a shorter waveform of the first and second pixel driving schemes for the drive waveform;

inserting the drive waveform into a first portion of the transitional pixel driving scheme;

selecting a pixel color to remain fixed based in part on determining that the pixel color is associated with a largest amount of pixels in both a previous image and a desired image during a page transition;

determining, for the first pixel driving scheme and the second pixel driving scheme, relative impulse potentials of each nominal color relative to the fixed color;

subtracting the relative impulse potential of the first pixel driving scheme from the relative impulse potential of the second pixel driving scheme to determine an impulse potential for the contrast correction waveform; and inserting the contrast correction waveform into a remaining portion of the transitional pixel driving scheme;

driving the electronic paper display with the transitional pixel driving scheme; and in response to determining that the rate of page transition is fixed at the second rate, driving the display with the second pixel driving scheme.

2. The method of claim 1, wherein driving the display with the first pixel driving scheme, driving the display with the transitional pixel driving scheme and driving the display with the second pixel driving scheme are DC balanced.

3. The method of claim 1, wherein driving the display with the transitional pixel driving scheme changes the relative impulse potentials of at least one nominal color.

4. The method of claim 1, wherein the contrast correction waveform is inserted after the drive waveform in the transitional pixel driving scheme.

5. The method of claim 1, further comprising entering a page transition mode based on receiving a start signal from a user and determining that the rate of page transition is varying from the first rate to the second rate.

6. The method of claim 1, further comprising exiting a page transition mode based on receiving a stop signal from a user and determining that the rate of page transition is fixed at the second rate.

7. The method of claim 1 further comprising:

driving the pixels to an extreme optical state using the first driving scheme; and driving the pixels to a desired color using the transitional driving scheme.

8. The method of claim 1 further comprising:

driving the pixels to an extreme optical state using the transitional pixel driving scheme; and driving the pixels to a desired color using the second pixel driving scheme.

9. A computer program product comprising a non-transitory computer usable medium including a computer readable program, wherein the computer readable program when executed on a computer causes the computer to:

drive an electronic paper display with a first pixel driving scheme having a first rate of page transition;

determine a second pixel driving scheme having a second rate of page transition;

in response to determining that the rate of page transition is varying from the first rate to the second rate, determine a transitional pixel driving scheme, including a drive waveform and a contrast correction waveform, by:

selecting a waveform length for the transitional pixel driving scheme, wherein the waveform length for the transitional pixel driving scheme is equal in length to a longer waveform length of the first and second pixel driving schemes;

using a shorter waveform of the first and second pixel driving schemes for the drive waveform;

inserting the drive waveform into a first potion of the transitional pixel driving scheme;

selecting a pixel color to remain fixed based in part on determining that the pixel color is associated with a largest amount of pixels in both a previous image and a desired image during a page transition;

determining, for the first pixel driving scheme and the second pixel driving scheme, relative impulse potentials of each nominal color relative to the fixed color;

subtracting the relative impulse potential of the first pixel driving scheme from the relative impulse potential of the second pixel driving scheme to determine an impulse potential for the contrast correction waveform; and inserting the contrast correction waveform into a remaining portion of the transitional pixel driving scheme;

drive the electronic paper display with the transitional pixel driving scheme; and in response to determining that the rate of page transition is fixed at the second rate, drive the display with the second pixel driving scheme.

10. The computer program product of claim 9, wherein the first pixel driving scheme, the transitional pixel driving scheme and the second pixel driving scheme are DC balanced.

11. The computer program product of claim 9, wherein the transitional pixel driving scheme changes the relative impulse potentials of at least one nominal color.

12. The computer program product of claim 9, wherein the computer readable program when executed on the computer causes the computer to insert the contrast correction waveform after the drive waveform in the transitional pixel driving scheme.

13. The computer program product of claim 9, wherein the computer readable program when executed on the computer causes the computer to enter a page transition mode based on receiving a start signal from a user and determining that the rate of page transition is varying from the first rate to the second rate.

14. The computer program product of claim 9, wherein the computer readable program when executed on the computer causes the computer to exit a page transition mode based on receiving a stop signal from a user and determining that the rate of page transition is fixed at the second rate.

15. The computer program product of claim 9, wherein the computer readable program when executed on the computer causes the computer to:

drive the pixels to an extreme optical state using the first pixel driving scheme; and drive the pixels to a desired color using the transitional pixel driving scheme.

16. The computer program product of claim 9, wherein the computer readable program when executed on the computer causes the computer to:

drive the pixels to an extreme optical state using the transitional pixel driving scheme; and drive the pixels to a desired color using the second pixel driving scheme.

17. An apparatus for updating an electronic paper display, the apparatus comprising:

a first storage for storing fixed rate pixel driving schemes including a first pixel driving scheme having a first rate of page transition and a second pixel driving scheme having a second rate of page transition;

a page transition block feeding module for determining and transmitting page transition blocks;

a DC balance module for:

providing the fixed rate pixel driving schemes and a transitional pixel driving scheme, the DC balance module coupled to the first storage for retrieving the fixed rate pixel driving schemes;

generating the transitional pixel driving scheme including a drive waveform and a contrast correction waveform by:

selecting a waveform length for the transitional pixel driving scheme, wherein the waveform length for the transitional pixel driving scheme is equal in length to a longer waveform length of the first and second pixel driving schemes;

using a shorter waveform of the first and second pixel driving schemes for the drive waveform;

inserting the drive waveform into a first portion of the transitional pixel driving scheme;

selecting a pixel color to remain fixed based on determining that the pixel color is associated with a largest amount of pixels in both a previous image and a desired image during a page transition;

determining relative impulse potentials of each nominal color relative to the fixed color for the fixed rate pixel driving schemes;

subtracting the relative impulse potential of the first pixel driving scheme from the relative impulse potential of the second pixel driving scheme to determine an impulse potential for the contrast correction waveform; and inserting the contrast correction waveform into a remaining portion of the transitional pixel driving scheme; and a display controller having a waveform buffer, the waveform buffer coupled to receive and store the fixed rate pixel driving schemes and the transitional pixel driving scheme from the DC balance module, the display controller coupled to receive the page transition blocks from the page transition block feeding module, the display controller using the fixed rate pixel driving schemes, the transitional pixel driving scheme and the page transition blocks for controlling the electronic paper display.

18. The apparatus of claim 17, further comprising a second storage for storing the transitional pixel driving scheme, the second storage coupled to the DC balance module.

19. The apparatus of claim 17, wherein the DC balance module inserts the contrast correction waveform after the drive waveform in the transitional pixel driving scheme.

20. The apparatus of claim 17, wherein the DC balance module and the display controller cooperate to drive the pixels to an extreme optical state and to drive the pixels to a desired color when transitioning between the fixed rate pixel driving scheme and the transitional pixel driving scheme.

* * * * *